US012638161B2

(12) United States Patent
    Oh

(10) Patent No.: US 12,638,161 B2
(45) Date of Patent: May 26, 2026

(54) ADJUSTABLE-DEPTH ASSEMBLIES FOR LUMINAIRES AND OTHER DEVICES

(71) Applicant: ERICO International Corporation, Solon, OH (US)

(72) Inventor: Michael Hung-Sun Oh, Twinsburg, OH (US)

(73) Assignee: ERICO International Corporation, Solon, OH (US)

( * ) Notice: Subject to any disclaimer, the term of this patent is extended or adjusted under 35 U.S.C. 154(b) by 180 days.

(21) Appl. No.: 18/544,277

(22) Filed: Dec. 18, 2023

(65) Prior Publication Data

US 2024/0200759 A1      Jun. 20, 2024

Related U.S. Application Data

(60) Provisional application No. 63/476,070, filed on Dec. 19, 2022.

(51) Int. Cl.
    *H02G 3/12*      (2006.01)
    *F21V 21/04*      (2006.01)
    (Continued)

(52) U.S. Cl.
    CPC .............. *F21V 21/04* (2013.01); *F21V 21/22* (2013.01); *H02G 3/085* (2013.01); *H02G 3/12* (2013.01)

(58) Field of Classification Search
    CPC ............ H02G 3/08; H02G 3/081; H02G 3/12; H02G 3/085; H02G 3/121; H02G 3/123; H02G 3/18; F21V 21/04; F21V 21/22
    (Continued)

(56) References Cited

U.S. PATENT DOCUMENTS

| | | | |
|---|---|---|---|
| 1,972,794 A | 9/1934 | Reese | |
| 2,378,861 A | 6/1945 | Peevey | |

(Continued)

FOREIGN PATENT DOCUMENTS

| | | | |
|---|---|---|---|
| CN | 201994611 U | 9/2011 | |
| CN | 202856271 U | 4/2013 | |

(Continued)

OTHER PUBLICATIONS

The Home Depot, 1-Gang 21 cu. in. New Work Non-Metallic Electrical Wall Box with Adjustable Bracket. https://www.homedepot. com/p/Carlon-1-Gang-21-cu-in-PVC-New-Work-Electrical-Switch- and-Outlet-Box-with-Adjustable-Bracket-B121ADJ-04R/2020. com, 5 pages, printed Jul. 17, 2024.

(Continued)

*Primary Examiner* — Angel R Estrada
(74) *Attorney, Agent, or Firm* — Quarles & Brady LLP

(57)      ABSTRACT

An assembly is provided for adjustable-depth installation of a lighting device relative to a support structure. The assembly can include a centerplate with a plate opening. The assembly can further include an electrical box with an extendable sleeve and an electrical box housing. The extendable sleeve can be slidably received within the electrical box housing and the electrical box housing can be received within the plate opening. The extendable sleeve can have a front opening and the electrical box housing can have a front opening. The extendable sleeve can be movable between a retracted position in which the front openings of the extendable sleeve and the electrical box housing can be spaced outward from the plate opening by a first distance and an extendable position in which the front opening of the extendable sleeve can be spaced outward from the plate opening a second distance larger than the first distance.

20 Claims, 13 Drawing Sheets

(51) Int. Cl.
　　*F21V 21/22*　　　(2006.01)
　　*H02G 3/08*　　　(2006.01)
(58) Field of Classification Search
　　USPC ........................ 174/50, 53, 57, 58, 480, 481;
　　　　　　　　　　220/3.2–3.9, 4.02; 248/906, 343
　　See application file for complete search history.

(56) References Cited

U.S. PATENT DOCUMENTS

| | | | |
|---|---|---|---|
| 2,675,140 A | 4/1954 | Pommerening | |
| 3,834,658 A | 9/1974 | Theodorides | |
| 4,634,015 A | 1/1987 | Taylor | |
| 5,042,673 A | 8/1991 | McShane | |
| 5,117,996 A | 6/1992 | McShane | |
| 5,289,934 A | 3/1994 | Smith et al. | |
| 5,603,424 A | 2/1997 | Bordwell et al. | |
| 5,661,264 A | 8/1997 | Reiker | |
| 5,677,512 A | 10/1997 | Reiker | |
| 5,824,952 A | 10/1998 | Bordwell et al. | |
| 5,854,443 A | 12/1998 | Reiker | |
| 5,883,331 A | 3/1999 | Reiker | |
| 5,907,124 A | 5/1999 | Reiker | |
| 5,909,006 A | 6/1999 | Reiker | |
| 5,931,325 A | 8/1999 | Filipov | |
| 5,938,157 A | 8/1999 | Reiker | |
| 5,942,726 A | 8/1999 | Reiker | |
| 5,965,845 A | 10/1999 | Reiker | |
| 5,981,874 A | 11/1999 | Reiker | |
| 6,096,974 A | 8/2000 | Reiker | |
| 6,204,450 B1 | 3/2001 | Reiker | |
| 6,207,894 B1 | 3/2001 | Reiker | |
| 6,207,897 B1 | 3/2001 | Reiker | |
| 6,207,898 B1 | 3/2001 | Reiker | |
| 6,242,696 B1 | 6/2001 | Reiker | |
| 6,281,439 B1 | 8/2001 | Reiker | |
| 6,291,768 B1 | 9/2001 | Reiker | |
| 6,303,859 B1 | 10/2001 | Reiker | |
| 6,303,862 B1 | 10/2001 | Reiker | |
| 6,335,486 B1 | 1/2002 | Reiker | |
| 6,423,899 B1 | 7/2002 | Reiker | |
| 6,737,576 B1 | 5/2004 | Dinh | |
| 6,820,760 B2 | 11/2004 | Wegner et al. | |
| 6,875,922 B1 | 4/2005 | Petak et al. | |
| 7,276,661 B2 | 10/2007 | Wegner et al. | |
| 7,301,099 B1 | 11/2007 | Korcz | |
| 7,312,395 B1 | 12/2007 | Gretz | |
| 7,410,072 B2 | 8/2008 | Wegner et al. | |
| D579,879 S | 11/2008 | Wegner et al. | |
| D584,236 S | 1/2009 | Wegner et al. | |
| 7,495,170 B2 * | 2/2009 | Dinh ........................ | H02G 3/14 |
| | | | 33/528 |
| 7,531,743 B2 | 5/2009 | Johnson et al. | |
| 7,563,979 B1 | 7/2009 | Gretz | |
| 7,586,039 B1 | 9/2009 | Gretz | |
| 7,637,385 B2 | 12/2009 | Wegner et al. | |
| 7,645,936 B2 | 1/2010 | Magno, Jr. | |
| 7,759,576 B1 | 7/2010 | Gretz | |
| RE41,661 E | 9/2010 | Dinh | |
| 7,820,911 B1 | 10/2010 | Gretz | |
| 7,834,267 B1 | 11/2010 | Gretz | |
| 7,838,769 B2 | 11/2010 | Peck | |
| 7,847,190 B1 | 12/2010 | Gretz | |
| 8,044,300 B1 | 10/2011 | Gretz | |
| 8,063,302 B1 | 11/2011 | Gretz | |
| 8,076,577 B2 | 12/2011 | Mango, Jr. et al. | |
| 8,076,578 B1 | 12/2011 | Gretz | |
| 8,124,873 B1 | 2/2012 | Gretz | |
| 8,314,350 B1 | 11/2012 | Gretz | |
| 8,324,516 B1 | 12/2012 | Gretz | |
| 8,347,491 B1 | 1/2013 | Baldwin et al. | |
| 8,357,853 B1 | 1/2013 | Gretz | |
| 8,445,779 B1 | 5/2013 | Gretz | |
| 8,575,484 B1 | 11/2013 | Witherbee | |
| 8,616,513 B2 | 12/2013 | Kerr, Jr. | |
| 8,633,384 B1 | 1/2014 | Shotey et al. | |

| | | | |
|---|---|---|---|
| 8,650,743 B2 | 2/2014 | Baldwin et al. | |
| 8,658,894 B1 | 2/2014 | Witherbee | |
| 8,710,367 B2 | 4/2014 | Korcz et al. | |
| 8,899,431 B1 | 12/2014 | Shotey et al. | |
| 8,920,911 B2 | 12/2014 | McNeil et al. | |
| 8,975,519 B2 | 3/2015 | Lalancette et al. | |
| 8,987,593 B2 * | 3/2015 | Korcz .................... | H02G 3/086 |
| | | | 362/147 |
| 9,252,579 B2 | 2/2016 | Korcz et al. | |
| 9,553,438 B2 | 1/2017 | Korcz et al. | |
| 9,711,955 B2 | 7/2017 | Hitchman | |
| 9,819,167 B2 | 11/2017 | Kummer | |
| 9,847,631 B2 | 12/2017 | Shotey et al. | |
| 9,887,524 B1 | 2/2018 | Gretz | |
| 9,893,503 B2 * | 2/2018 | Geno ..................... | H02G 3/086 |
| 9,966,746 B1 | 5/2018 | Ediger et al. | |
| 10,096,983 B2 | 10/2018 | Kummer | |
| 10,128,644 B1 | 11/2018 | Gilstrap | |
| 10,177,509 B1 | 1/2019 | Gilstrap | |
| 10,193,318 B1 | 1/2019 | Hitchman | |
| 10,256,614 B2 | 4/2019 | Korcz et al. | |
| 10,263,403 B2 | 4/2019 | Korcz et al. | |
| 10,295,163 B1 | 5/2019 | Cohen | |
| 10,447,019 B2 | 10/2019 | Ediger et al. | |
| 10,454,257 B2 | 10/2019 | Gilstrap | |
| 10,700,501 B2 | 6/2020 | Korcz et al. | |
| 10,876,721 B1 | 12/2020 | Cohen | |
| 11,025,043 B2 | 6/2021 | Korcz et al. | |
| 11,183,824 B2 | 11/2021 | Gilstrap | |
| 11,460,157 B2 | 10/2022 | Cohen et al. | |
| 2002/0011345 A1 | 1/2002 | Reiker | |
| 2003/0189043 A1 | 10/2003 | Wegner et al. | |
| 2005/0051546 A1 | 3/2005 | Dinh | |
| 2005/0230142 A1 | 10/2005 | Dinh | |
| 2008/0093121 A1 * | 4/2008 | Webb ........................ | H02G 1/00 |
| | | | 174/502 |
| 2008/0156514 A1 | 7/2008 | Webb | |
| 2009/0057303 A1 | 3/2009 | Oddsen et al. | |
| 2009/0183891 A1 | 7/2009 | Kramer, Jr. | |
| 2010/0089912 A1 | 4/2010 | Wegner et al. | |
| 2010/0176138 A1 | 7/2010 | Zacharevitz et al. | |
| 2010/0252552 A1 | 10/2010 | Nikayin et al. | |
| 2010/0288554 A1 | 11/2010 | Jafari | |
| 2012/0018600 A1 | 1/2012 | Kerr, Jr. | |
| 2012/0186871 A1 * | 7/2012 | Roberts .................. | H02G 3/086 |
| | | | 29/592.1 |
| 2014/0202758 A1 | 7/2014 | Lolachi | |
| 2014/0224792 A1 | 8/2014 | Beneke | |
| 2019/0252868 A1 | 8/2019 | Gilstrap | |
| 2019/0305538 A1 | 10/2019 | Korcz et al. | |
| 2019/0312420 A1 | 10/2019 | Korcz et al. | |
| 2020/0052473 A1 | 2/2020 | Gilstrap | |
| 2021/0080081 A1 | 3/2021 | Cohen | |
| 2021/0156512 A1 | 5/2021 | Wilson et al. | |
| 2022/0006277 A1 | 1/2022 | Beristany et al. | |
| 2022/0034488 A1 | 2/2022 | Cohen | |
| 2022/0243883 A1 | 8/2022 | Cohen | |

FOREIGN PATENT DOCUMENTS

| | | | |
|---|---|---|---|
| CN | 205159976 U | 4/2016 | |
| CN | 105391009 B | 11/2017 | |
| CN | 206806923 U | 12/2017 | |
| CN | 208142617 U | 11/2018 | |
| CN | 208423700 U | 1/2019 | |
| CN | 109326995 A | 2/2019 | |
| CN | 109768513 A | 5/2019 | |
| CN | 210985547 U | 7/2020 | |
| CN | 211428837 U | 9/2020 | |
| CN | 214013788 U | 8/2021 | |
| CN | 214626248 U | 11/2021 | |
| CN | 215221640 U | 12/2021 | |
| CN | 217882719 U | 11/2022 | |
| EP | 1003260 A1 | 5/2000 | |
| EP | 1670112 B1 | 3/2008 | |
| EP | 1744427 B1 | 7/2008 | |
| EP | 1926192 B1 | 3/2013 | |
| EP | 2822120 B1 | 1/2016 | |
| EP | 3524738 B1 | 4/2020 | |

(56)         References Cited

FOREIGN PATENT DOCUMENTS

| | | | |
|---|---|---|---|
| EP | 4002617 | A1 | 5/2022 |
| EP | 3703207 | B1 | 9/2022 |
| GB | 2540122 | B | 4/2020 |
| GB | 2601296 | A | 6/2022 |
| KR | 10-1087495 | B1 | 11/2011 |
| KR | 10-1625458 | B1 | 5/2016 |
| KR | 20-0480654 | Y | 6/2016 |
| KR | 10-2073681 | B1 | 2/2020 |
| WO | 2009/015041 | A2 | 1/2009 |
| WO | 2010/008778 | A2 | 1/2010 |
| WO | 2011/038238 | A2 | 3/2011 |

OTHER PUBLICATIONS

Primus Cable, Adjustable Depth Mounting Bracket—New Construction, https://www.primuscable.com/products/adjustable-depth-mounting-bracket-black-plastic-1-gang-2-gang-new-construction?variant=29921666924589, 4 pages, printed Jul. 17, 2024.

* cited by examiner

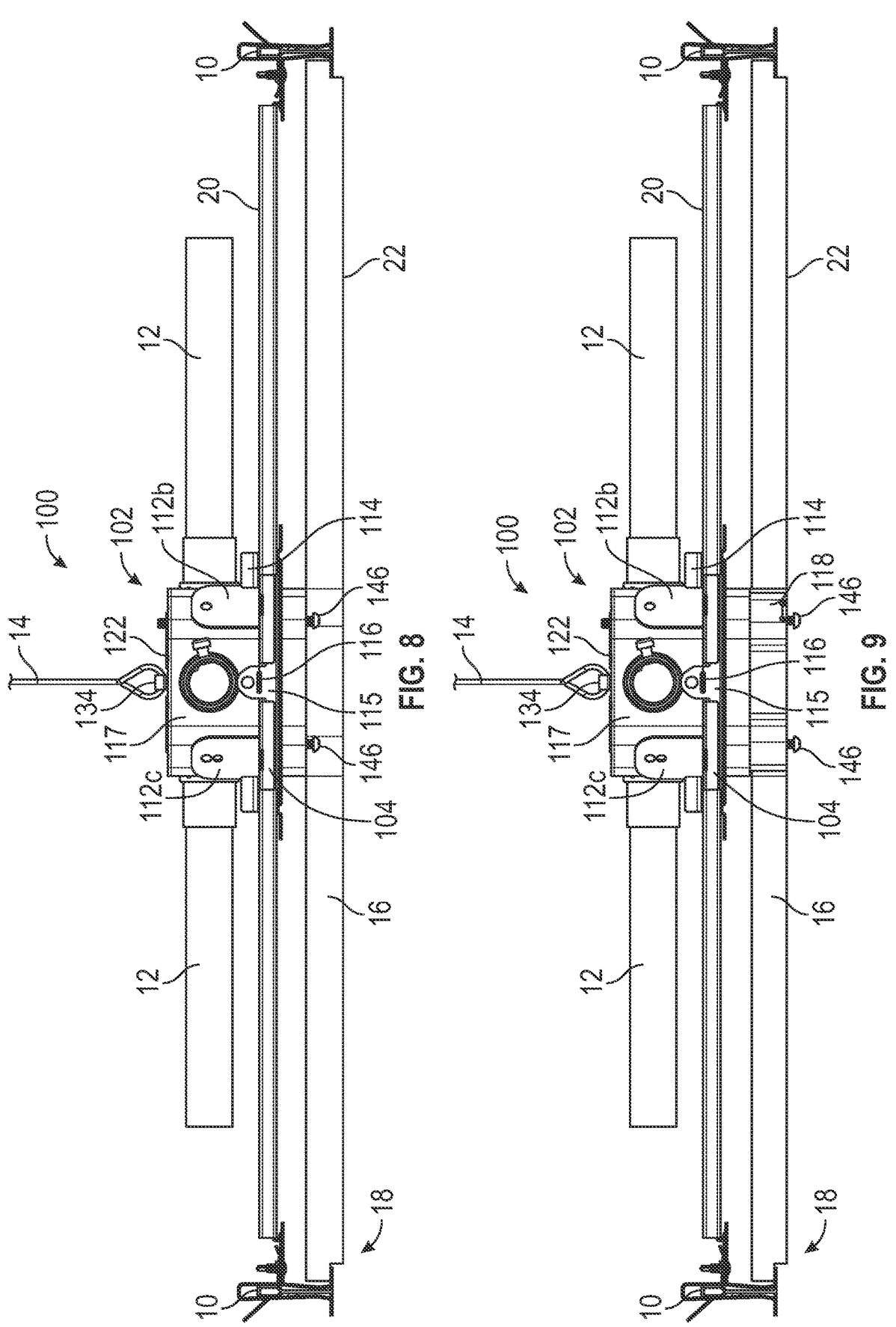

ADJUSTABLE-DEPTH ASSEMBLIES FOR LUMINAIRES AND OTHER DEVICES

CROSS-REFERENCE TO RELATED APPLICATIONS

This application claims priority under 35 U.S.C. 119 from U.S. Provisional Application No. 63/476,070, filed Dec. 19, 2022, titled "Adjustable-Depth Electrical Boxes," which is incorporated herein by reference in its entirety.

BACKGROUND

In many applications, it may be useful to adjust the depth of electrical devices during or after installation relative to support structures, for example, wall or ceiling structures of buildings. In some cases, it may be useful to adjust electrical boxes relative to a particular support structure to provide a flush alignment with the front of the electrical box and an outer surface of the wall structure.

SUMMARY

Some embodiments of the invention provide an assembly for adjustable-depth installation of a lighting device relative to a support structure. The assembly can include a center-plate with a plate opening, and an electrical box with an extendable sleeve and an electrical box housing. The extendable sleeve can be slidably received within the electrical box housing and the electrical box housing can be received within the plate opening. The extendable sleeve can have a front opening and the electrical box housing can have a front opening. The extendable sleeve may be movable between a retracted position in which the front openings of the extendable sleeve and the electrical box housing are spaced outward from the plate opening by a first distance and an extendable position in which the front opening of the extendable sleeve may be spaced outward from the plate opening a second distance that may be larger than the first distance.

Some embodiments of the invention provide an adjustable depth electrical box assembly. The electrical box assembly can include an electrical box housing that includes side walls and a back wall that define an interior area for electrical components and a front opening that provides access to the interior area. The electrical box assembly may further include an extendable sleeve that may be slidably received into the interior area of the electrical box housing at the front opening. The electrical box assembly may also include a set of adjustment fasteners that may be axially fixed relative to the electrical box housing and rotatably secured to the extendable sleeve so that the extendable sleeve may be movable along the set of adjustment fasteners between a retracted position and an extended position relative to the electrical box housing via rotation of the adjustment fasteners.

Some embodiments of the invention provide a method of securing a lighting assembly relative to a support structure. The method may include affixing a centerplate to the support structure, the centerplate including a plate opening, and supporting a lighting electrical box with an extendable sleeve and an electrical box housing. The extendable sleeve may be slidably received within the electrical box housing. The method may further include, after a support structure covering has been installed on the support structure and around the electrical box, adjusting the electrical box relative to the centerplate and an outer surface of the support structure covering by moving the extendable sleeve within the plate opening between a retracted position, in which a front opening of the extendable sleeve may be spaced outward from a front opening of the lighting electrical box by a first distance, and an extendable position, in which the front opening of the extendable sleeve may be spaced outward from the front opening of the lighting electrical box a second distance that may be larger than the first distance.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 8 is a side elevation view of the electrical box assembly of FIG. 1 in a retracted position installed on a ceiling structure according to an embodiment of the invention;

FIG. 9 is a side elevation view of the electrical box assembly of FIG. 1 in an extended position installed on the ceiling structure;

DETAILED DESCRIPTION

Figure 1:
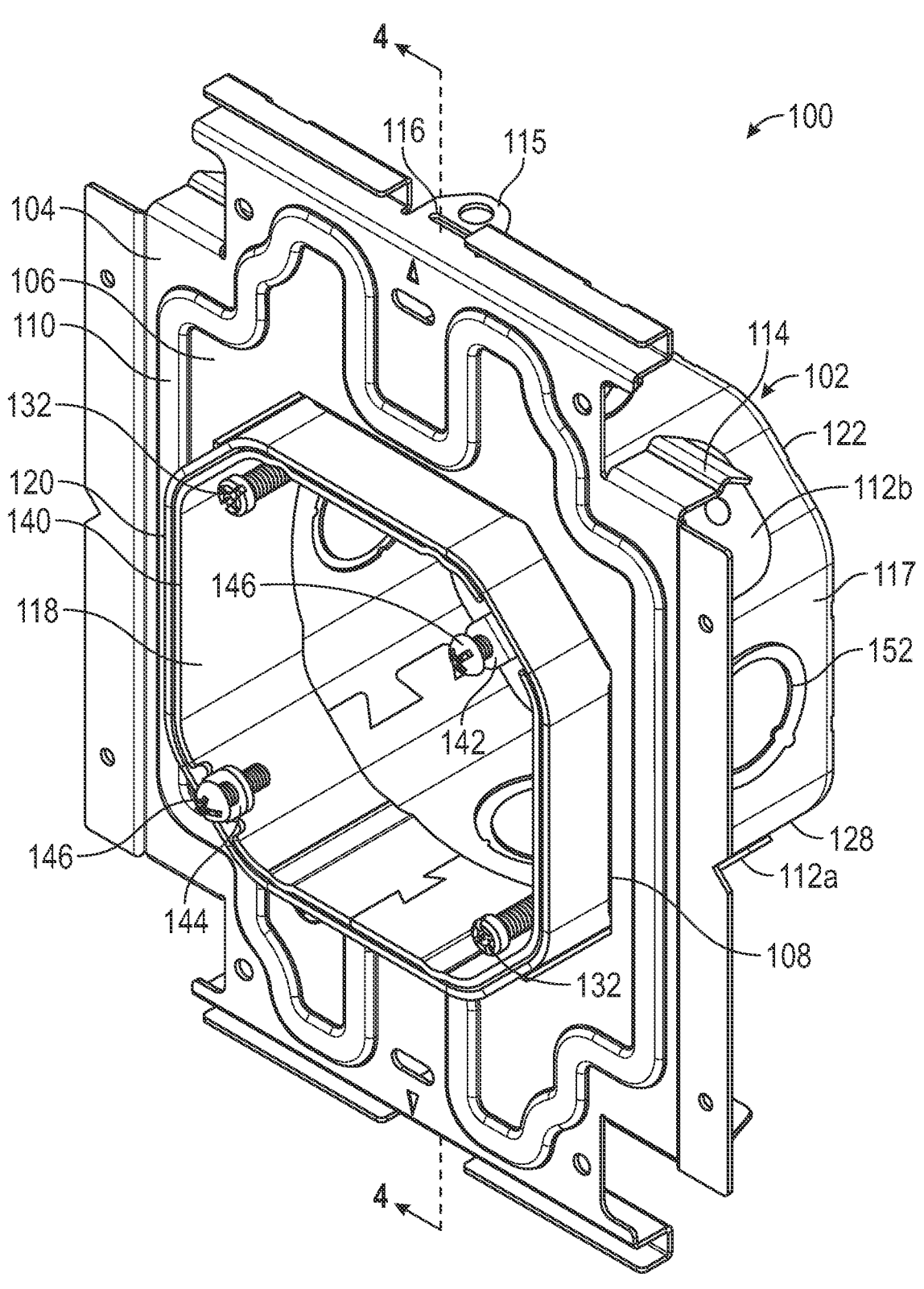
FIG. 1 is a front top isometric view of an electrical box assembly in according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In some conventional contexts, electrical box assemblies have utilized a mud ring configured to extend a front opening of the electrical box assembly. Though this has proven useful in the installation of switches, electrical outlets, and other low voltage devices, mud rings tend to include a flange or other component that reduces a width or area of a front opening of the electrical box. The reduction of the front opening width or size associated with the use of mud rings excludes their use when mounting lighting devices and other electrical components, configured to couple directly to an electrical box. Therefore, there remains a need for adjustable electrical boxes configured to couple and deliver electricity to lighting devices in luminaire assemblies, lighting fixtures, or other lighting assemblies.

As noted above, in some contexts, such as when installing lighting assemblies or other electrical assemblies, it may be useful to adjust the depth of electrical boxes (or other components) relative to a support structure (e.g., wall or ceiling structures of various known types, including standard studs, T-grid ceiling structures, etc.). For example, some standards may require that a front opening of an electrical box, in which, for example, electrical devices (e.g., light fixtures, luminaires, fire alarm systems, exit lights, other lighting devices, or the like) can be secured flush with an outward facing surface of a support structure covering (e.g., drywall, wood, tile, or a combination thereof to form a wall or ceiling surface). However, the electrical box may need to be secured to a support structure (e.g., a wall stud, a support bracket, a ceiling structure by a support wire, etc.) at a final depth that depends on the depth of the wall support covering. Because wall support coverings can be provided with a variety of depths, it may accordingly be necessary to adjust the depth of an electrical box relative to a particular support structure and the wall support covering(s) to bring the front opening of the electrical box flush with the wall support covering.

Additionally, support structures (e.g., a wall stud) can have different depths and can be formed from materials, such as, for example wood or metal. Some support structures can have a depth dimension of 2½", 3½", 3⅝", 4", 5½", 6", among others. Embodiments of the invention can provide an electrical box that can be secured to a wall stud, sized to fit within a wall space, and adjustable to extend the electrical box to bring the front opening of the electrical box flush with a wall support covering. In some embodiments, a support wire loop on a back side of the electrical box configured for receiving a support wire for supporting the electrical box from a ceiling structure can be also be used as a depth stop configured to contact a wall support covering opposite the front opening of the electrical box to reduce or prevent the electrical box from moving into the wall space after installation.

Further, associated methods for allowing easy adjustment of the depth of an electrical box relative to a support structure are also contemplated by the proposed electrical box and bracket assembly. In some embodiments, the methods for doing so can be performed after the bracket and the electrical box have been installed on the support structure and wall support coverings have been installed.

Embodiments of the invention are presented below in the context of particular support structures, including stud-framed walls and ceiling structures (e.g., suspended or "dropped" ceiling systems). Although these configurations can be particularly useful in some contexts, including due to the particular requirements for mounting electrical boxes to a wall stud or ceiling structure, other configurations are possible. For example, the principles disclosed herein—and embodiments of the invention—can be used with support structures other than those expressly illustrated or discussed, with mounting structures (e.g., telescoping or other brackets attached to and between wall studs or suspended ceiling grid members 10 shown in FIGS. 8 and 9), or in a variety of other contexts. Similarly, although particular configurations of electrical boxes are illustrated and discussed below, some embodiments of the invention can be used with electrical boxes having different configurations (e.g., more or less gangs, different shapes and depths, etc.).

Generally, embodiments of the invention can include an electrical box with an electrical box housing and an extendable sleeve moveable relative to the electrical box housing to adjust the overall depth of the electrical box. The extendable sleeve can be fully retained within the electrical box housing in a retracted position. The extendable sleeve can be coupled to the electrical box housing with threaded fasteners. Generally, in this regard, adjustment of the threaded fasteners can move the extendable sleeve in an axial direction defined by the threaded fasteners, relative to the electrical box housing.

In some embodiments, the extendable sleeve includes a front opening, having industry standard dimensions for electrical box front openings, as specified by UL514A. For example, the front opening of an octagonal sleeve can be manufactured such that mounting fasteners, configured to couple a lighting device to the electrical sleeve, are spaced 3.5 inches apart, per electrical box industry standard. As such the extendable sleeve can be sized to couple to standard lighting devices (e.g., light fixtures, luminaires, fire alarm systems, exit lights, or the like) having standard coupling points or apertures. As disclosed above, the use of a mud ring would fail to provide a proper extension in luminaire or other lighting assemblies (e.g., various light fixture assemblies), as mud rings are only sized to install switches, electrical outlets, and other low voltage devices.

In some embodiments, the invention can include a centerplate that includes a plate body and one or more arms that are collectively configured to secure and support the electrical box relative to the plate body. In some cases, the centerplate can be coupled to a support bracket that can be mounted to support structures, including stud-framed walls and ceiling structures.

In some embodiments, the threaded fasteners can be ribbed fasteners, such as fasteners with threads or circumferential ridges. For example, some embodiments can include threaded fasteners that are rotatable but not translatable relative to the electrical box housing. The threaded fasteners can accordingly be rotated by a user in order to cause a translational adjustment of the extendable sleeve relative to the electrical box housing. For example, rotation of threaded fasteners may cause translational movement of an extendable sleeve via engagement with a threaded fastener opening on the extendable sleeve.

In some embodiments, it may be useful to arrange the extendable sleeve and the electrical box housing so that the fasteners extend within the interior of the electrical box. In some such embodiments, the fasteners may be adjustable from within the electrical box. For example, a set of housing tabs extending into the electrical box housing may rotatably and non-translatably secure the threaded fasteners that extend from the extendable sleeve through threaded sleeve tabs on the extendable sleeve. A user can then engage a head of each of the fasteners from within the electrical box, thereby rotating the fasteners to cause the extendable sleeve to be translated relative to the electrical box housing via the threaded engagement of the fasteners with the sleeve tabs and the non-translatable engagement of the fasteners with the housing tabs.

The ability to adjust the mounting depth of an electrical box by engaging a fastener within the interior of the electrical box may be useful, for example, in order to facilitate easier adjustment of the electrical box after a wall covering (e.g., drywall, wood-paneling, tile, etc.) has been installed.

Referring to FIGS. 1 through 7, an example electrical box assembly 100 is shown according to an embodiment of the invention. In the illustrated example, the electrical box assembly 100 includes an electrical box 102 (shown here as an octagon electrical box) and a centerplate 104. The centerplate 104 has a plate body 106 with a plate opening 108 configured to receive the electrical box 102 therein and therethrough. As shown in FIG. 2A, the plate opening 108 is sized and configured to closely follow the octagon shape of the electrical box 102. This can provide for stable support thereof. The plate body 106 can include a stiffening feature, here shown as an embossment 110, stamped or otherwise formed within therein. The embossment 110 may extend continuously to surround the plate opening 108 to provide improved rigidity. In other embodiments, however, other configurations are possible, including configurations in which a plate body does not fully surround exterior sides of an electrical box.

A set of plate arms, including a first plate arm 112a and a second plate arm 112b (shown in FIGS. 3 and 6) and a third plate arm 112c and a fourth plate arm 112d (shown in FIG. 4A) can extend from the plate body 106. In the illustrated embodiment, the plate arms 112a, 112b, 112c, 112d are integrally formed with the plate body 106 and extend adjacent the plate opening 108. For example, the plate arms 112a, 112b, 112c, 112d may extend from a connection to the plate body 106 at an edge of the plate opening 108, which may allow the centerplate 104 to be manufactured with particular efficiency.

Figure 11B:
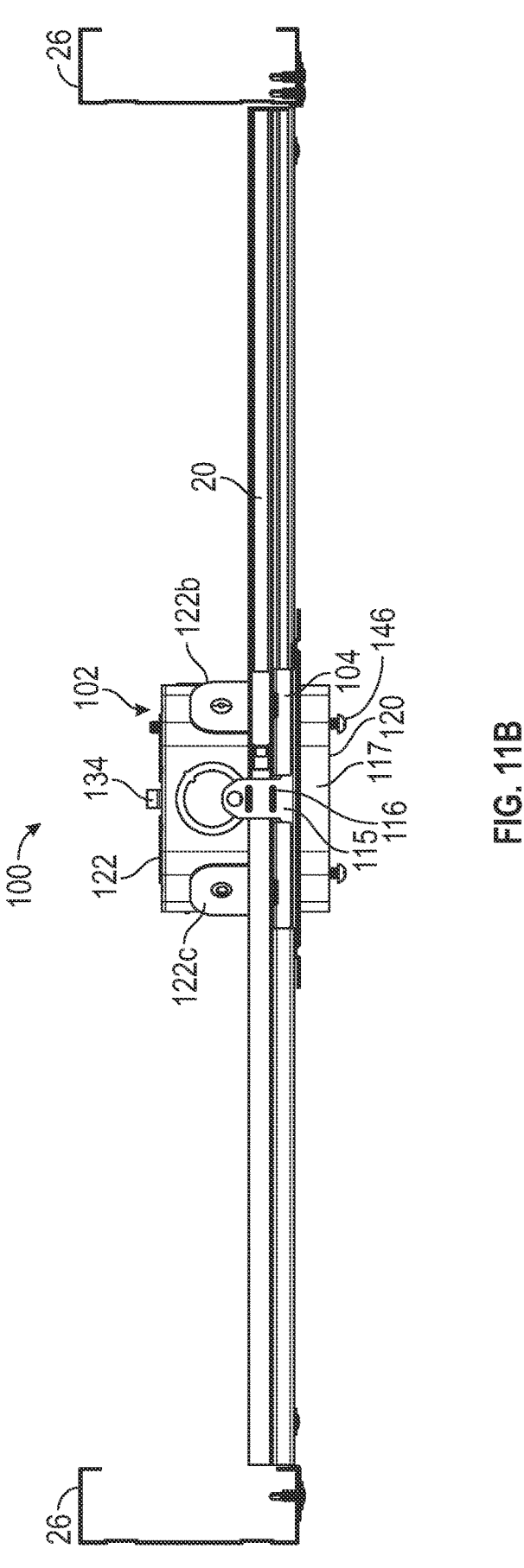
FIG. 11B is a top plan view of the electrical box assembly of FIG. 2B in an extended position installed on a wall structure.

The plate arms 112a, 112b, 112c, 112d are configured to extend at least partially along sidewalls of the electrical box 102 to secure the electrical box 102 to the centerplate 104. For example, the plate arms 112a, 112b, 112c, 112d can be fastened utilizing any type of fastening mechanism (e.g., threaded fasteners, welding, or the like). As illustrated in FIG. 11B, the plate arms 112a, 112b (and 112c, 112d not shown) can be secured using rivets. Rivets may advantageously provide an increased resistance to shear forces between the plate arms 112a, 112b, 112c, 112d and the electrical box. The first plate arm 112a and the third plate arm 112c may form a first set of plate arms 112a, 112c, extending along opposing sidewalls of the electrical box 102. Similarly, the second plate arm 112b and the fourth plate arm 112d may form a second set of plate arms 112b, 112d, also extending along opposing sidewalls of the electrical box 102.

Figure 3:
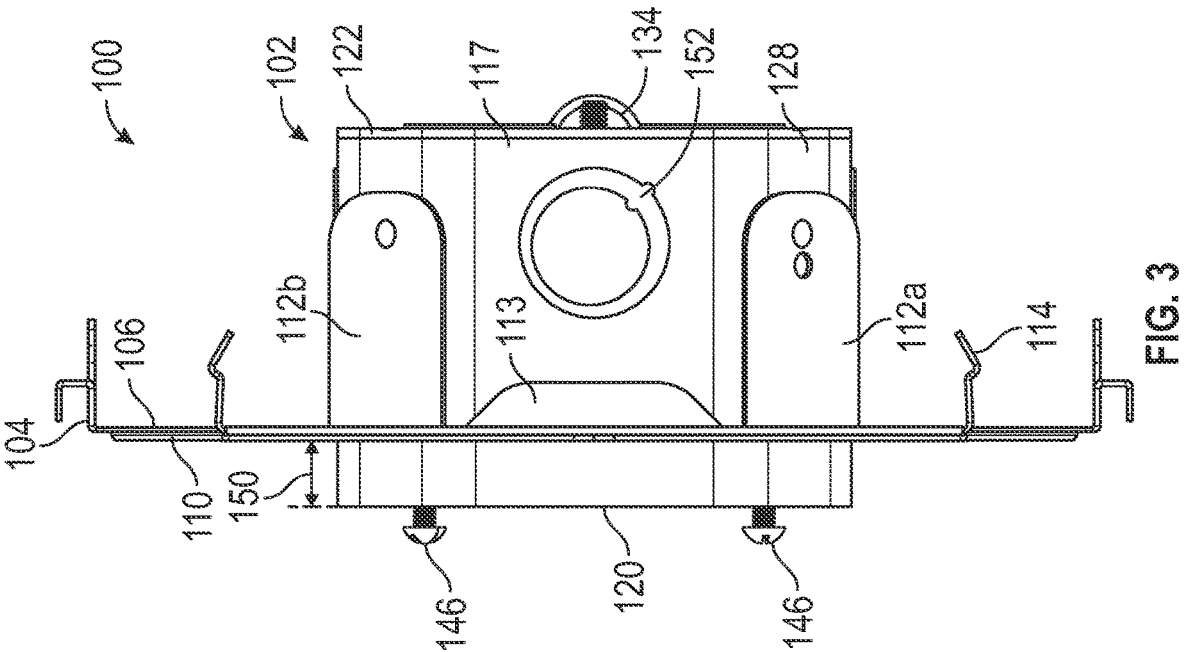
FIG. 3 is a side elevation view of the electrical box assembly of FIG. 1.

In some embodiments, plate arms may extend different distances along the electrical box 102. For example, a set of flanges (e.g. including a first flange 113, as shown in FIG. 3) can extend from the plate body 106 adjacent the plate opening 108. The first flange 113 (or others), can also be configured to extend at least partially along the electrical box 102, but may extend away from the plate body 106— and along the electrical box 102—by a shorter distance than the plate arms 112a, 112b, 112c, 112d. Thus, for example, the flanges 113 can further stabilize the electrical box 102 within the plate opening 108 without interfering with access to knockouts or other features on the electrical box 102. In other embodiments, however, other configurations are possible.

In some embodiments, the plate arms 112a, 112b, 112c, 112d and the flanges 113 may be disposed around the plate opening 108 in an alternating configuration. For example, each of the flanges 113 may be disposed circumferentially around the plate opening 108 between a corresponding set of the plate arms 112a, 112b, 112c, 112d (e.g., between plate arms 112a, 112b as shown in FIG. 3).

Referring again to FIG. 1, in some embodiments, the centerplate 104 may include securement features, configured to secure the centerplate 104 to a support bracket (e.g., a support bracket 20 as shown in FIGS. 8 and 9). In some embodiments, one or more spring arms 114 can extend from the plate body 106, configured to clamp the centerplate 104 to the support bracket 20. The spring arms 114 may be configured to secure the support bracket to a support bracket (e.g., a telescoping bracket) in conjunction with an upper or lower flange extending from a top and bottom edge of the plate body 106.

In some embodiments, one or more bendable tabs 115 can aid the retention of the support bracket. The one or more bendable tabs 115 may extend from a perimeter of the plate body 106. For example, the one or more bendable tabs 115 may extend from the top or bottom of the plate body 106. The one or more bendable tabs 115 may include one or bend lines 116. For example, the one or more bend lines 116 may be perforated or otherwise configured to allow an installer to bend the bendable tab 115 along the one or more bend lines 116. As illustrated in FIG. 11B, the one or more bendable tabs 115 may include more than one of the bend lines 116. Including more than one of the bend lines 116 on the bendable tab 115, may allow an installer to bend the bendable tab 115 at a plurality of distances from the plate body

106, to accommodate the securement of the centerplate 104 to support brackets of varying depths.

Figure 2A:
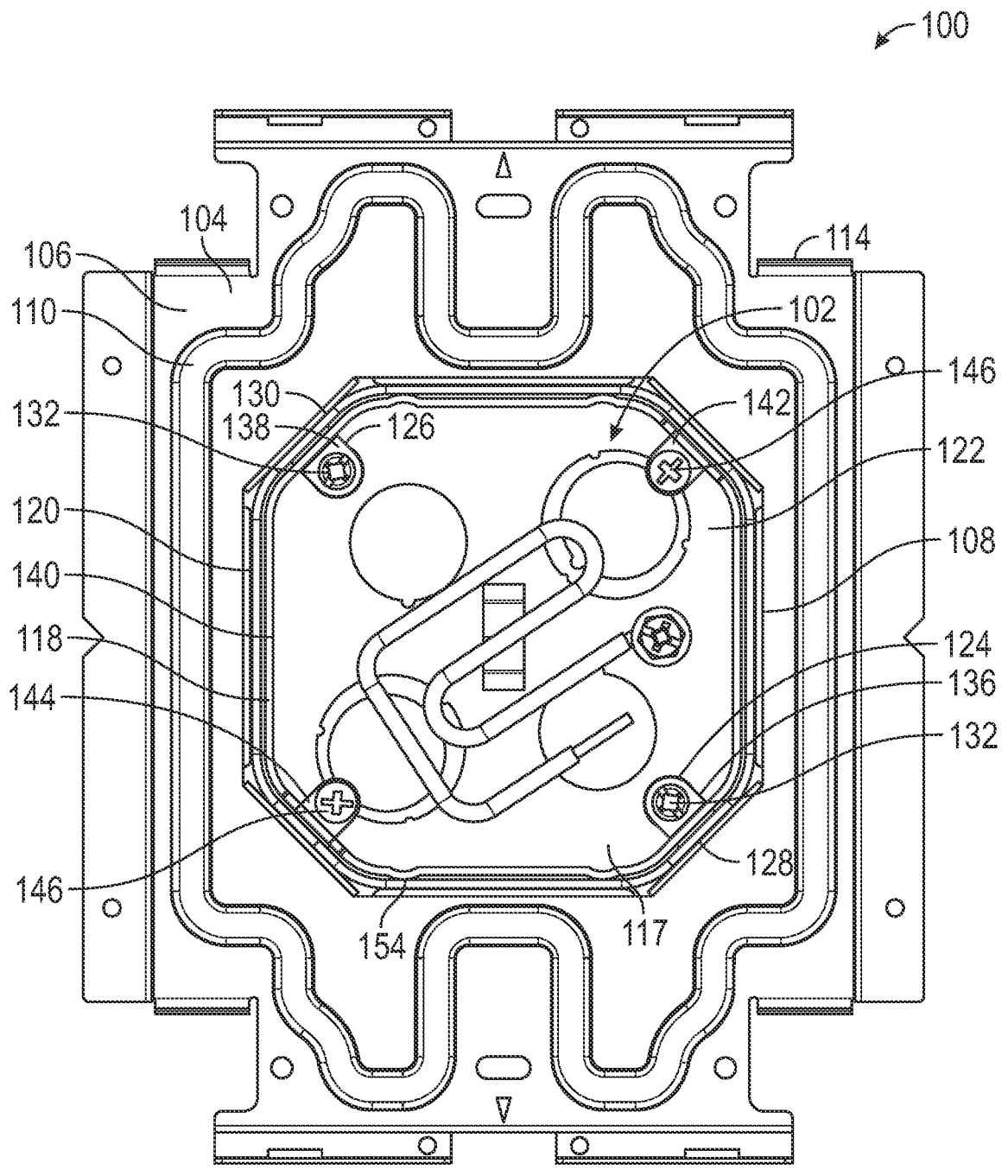
FIG. 2A is a front elevation view of the electrical box assembly of FIG. 1.

Referring to FIG. 2A, the electrical box 102 includes an electrical box housing 117 and an extendable sleeve 118. The electrical box housing 117 has a front opening 120 and a rear wall 122 opposite the front opening 120 and is, in particular, secured to the plate arms 112a, 112b, 112c, 112d. A set of housing tabs (here shown as a first housing tab 124 and a second housing tab 126) extend inward into the electrical box housing 117 from a first side wall 128 and a second side wall 130. The first and second side walls 128, 130 may be opposing side walls of the electrical box 102. The first and second side walls 128, 130 may be configured to retain threaded adjustment fasteners 132 and permit rotation of the adjustment fasteners 132 but not translation relative to the electrical box housing 117. For example, the adjustment fasteners 132 can be rotatable relative to the first and second housing tabs 124, 126 but can be translationally (axially) fixed relative to the first and second housing tabs 124, 126 (e.g., via riveting or peening of the fasteners, use of E-, C-, or other clips, use of integral or removable collars, or other techniques). In some embodiments, the first and second housing tabs 124, 126 can be secured to the electrical box housing 117 through welding (e.g., spot welding). In some embodiments, the adjustment fasteners 132 can be located in opposing corners of the electrical box housing 117, spaced as far from adjacent knockouts as possible, to prevent potential contact with electrical conductors entering and leaving the electrical box 102 via conduit 12 (shown in FIGS. 8 and 9) attached at the knockouts.

Figure 2B:
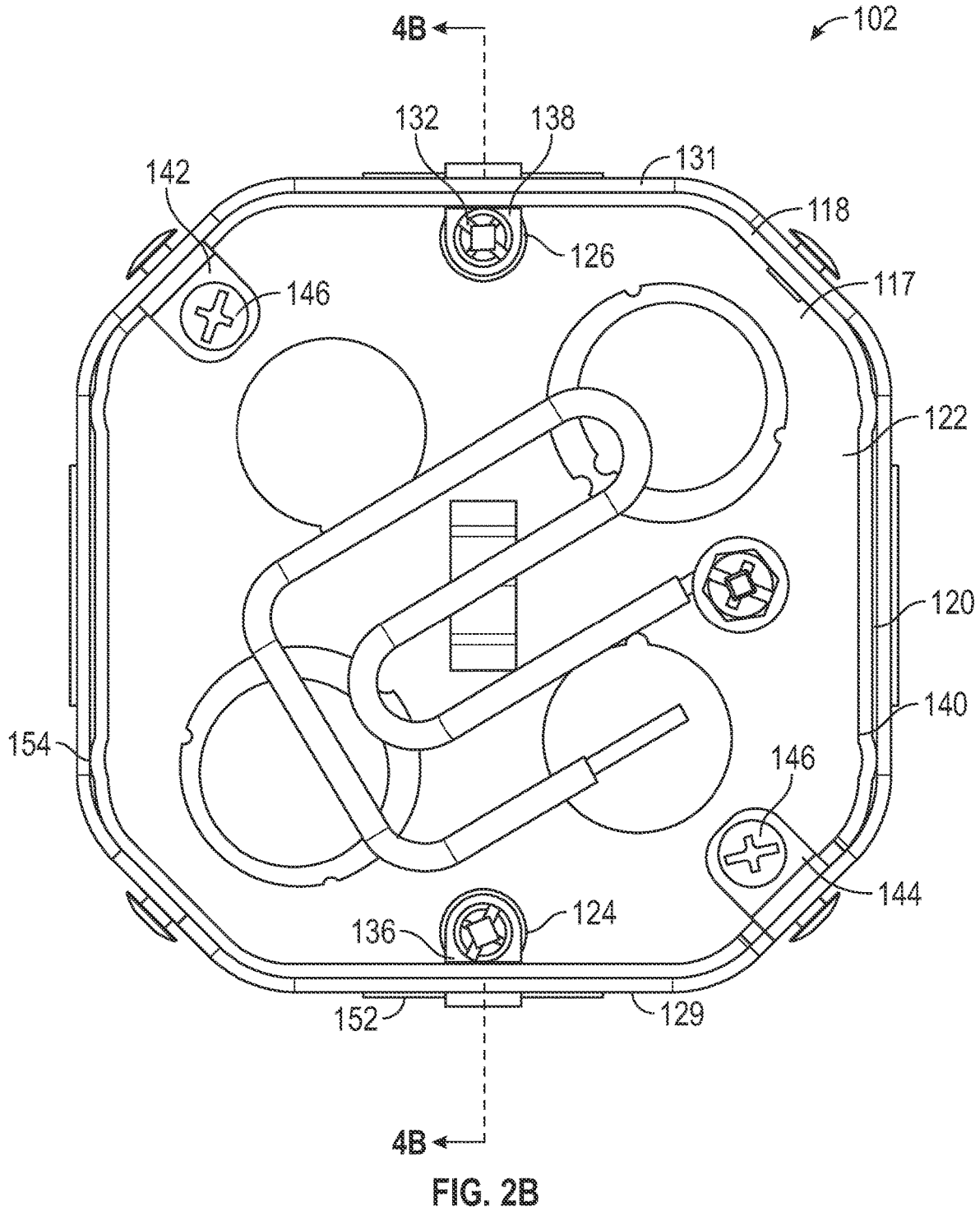
FIG. 2B is a front elevation view of another embodiment of the electrical box assembly of FIG. 1.
Figure 4A:
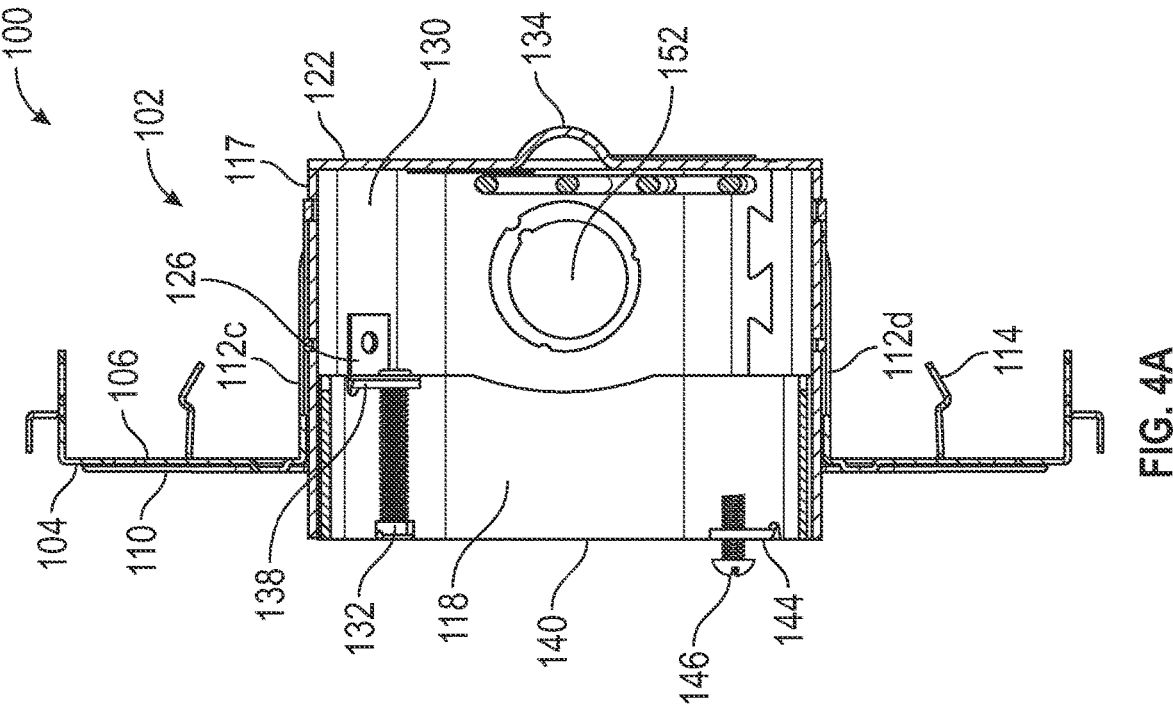
FIG. 4A is a cross-sectional view of the electrical box assembly of FIG. 1 along line 4-4 in FIG. 1.
Figure 4B:
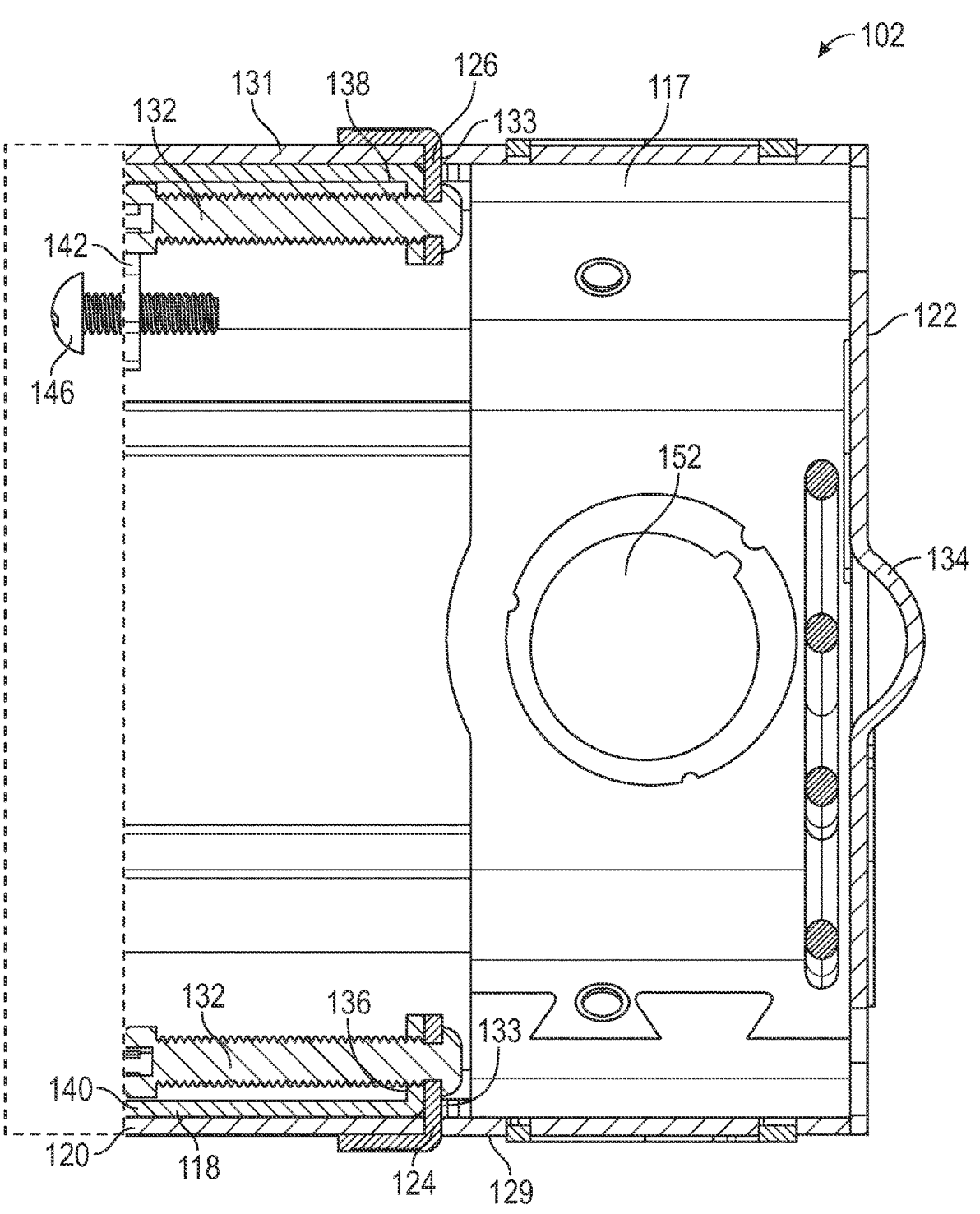
FIG. 4B is a cross-sectional of view of the electrical box assembly of FIG. 2B along line 2B-2B in FIG. 1

Referring to FIGS. 2B and 4B, in some embodiments, the adjustment fasteners 132 and first and second housing tabs 124, 126 are disposed on third and fourth sidewalls 129, 131. The third and fourth sidewalls 129, 131 may be opposing one another. The tabs 124, 126 may in some cases be aligned with the knockouts. As illustrated in FIG. 4B the first and second housing tabs 124, 126 can be separated from the knockouts, in a direction that is opposite the rear wall 122 (i.e., along the adjustment direction of the assembly). The separation can prevent potential contact with electrical conductors entering and leaving the electrical box 102.

In some embodiments, first and second housing tabs 124, 126 can extend into the electrical box housing 117 from an exterior of the corresponding side wall 128, 129, 130, 131. For example, as illustrated in FIG. 4B, a portion of the first and second housing tabs 124, 126 can be welded (e.g., spot welded) to an exterior surface of the sidewalls 129, 131. The first and second housing tabs 124, 126 that are welded to an exterior of the sidewalls 129, 131 can extend through apertures 133 disposed in the sidewalls 129, 131. The first and second housing tabs 124, 126 that are welded to an exterior surface of the sidewalls 129, 131 may advantageously reduce interference to the electrical conductors entering and leaving the electrical box 102, while also mitigating obstruction to the movement of the extendable sleeve 118.

As illustrated in FIGS. 3 and 4, the electrical box 102 also includes a support wire loop 134 extending outward from the rear wall 122. The support wire loop 134 is configured to receive a support wire (e.g., a support wire 14 shown in FIGS. 8 and 9) used to add further support of the electrical box assembly 100 to a support structure when installed on a suspended ceiling system, for example.

Referring again to FIG. 2A, the extendable sleeve 118 is configured to be received through the front opening 120 of the electrical box housing 117 and movable relative thereto. The extendable sleeve 118 includes a set of sleeve tabs (here shown as a first sleeve tab 136 and a second sleeve tab 138). The first and second sleeve tabs 136, 138 are threaded and configured to threadably receive the adjustment fasteners 132. The adjustment fasteners 132 effectively couple the extendable sleeve 118 to the electrical box housing 117. The extendable sleeve 118 also includes a front opening 140 and mounting tabs 142, 144 extending inward into the front opening 140 that are configured to receive device fasteners 146 to secure electrical devices (e.g., light fixtures, luminaires, fire alarm systems, exit lights, or the like) to the extendable sleeve 118.

In some embodiments, the dimensions of the extendable sleeve 118, including the placement of the mounting tabs 142, 144, can be the same as a standard, non-adjustable, electrical box. For example, according to standard UL514A Fixture/Luminaire Clause 7.7.1, for mounting lighting devices to electrical boxes, a distance between a center of the device fastener 146 secured to the mounting tab 142 and a center of the device fastener 146 secured to the mounting tab 144 may be about 3.5 inches for octagon shaped electrical boxes. Furthermore, the mounting tabs 142, 144 may be configured to receive the device fasteners 146 that are number 8 size screws. According to standard UL514A Fixture/Luminaire Clause 9.4.5.3, number 8 size screws are required to mount fixture or luminaire devices directly to electrical boxes. Though the embodiment described above specifically requires number 8 size screws, the tabs 142, 144 may be configured to receive any size of the device fastener 146. As used herein, reference to screw sizes are based on the United States Unified Thread Standard as specified ANSI/ASME B1.1.

In contrast to fixture or luminaire devices, according to standard NEMA OS 1, non-fixture or non-luminaire devices cannot be directly mounted to square and octagon shaped electrical boxes. For example, non-fixture or non-luminaire devices must be mounted to a mud ring that is mounted to the electrical box. Furthermore, according to the standard NEMA OS 1, the mounting of the mud ring to the tabs 142, 144 and the mounting of the non-fixture non-luminaire device to the mud ring both specifically require number 6 size mounting screws. Finally, a distance between a center of the mounting screws that mount the non-fixture non-luminaire device to the mud ring is dissimilar to a distance between a center of the mounting screws that mount a fixture or luminaire device to the electrical box. For example, in some cases, mounting screws that mount the non-fixture or non-luminaire device to the mud ring may be about 3 9/32 inches apart according to the standard NEMA OS 1.

In some embodiments, for example, an electrical box 302 (shown in FIGS. 14 through 16) according to the invention can include an electrical box housing 317 with a front opening 320 with a square shape, wherein an extendable sleeve 318 has dimensions the same as a standard, non-adjustable, square electrical box. For example, the extendable sleeve 318 may be a 4-inch×4-inch square. In such examples, it follows that the front opening 120, 320 can include dimensions that are larger than a standard electrical box. Furthermore, in such examples, the electrical box housing 317, 117 may include a larger volume allowing for better conductor organization or storage.

The extendable sleeve 118, having the front opening 320 that conforms to standard electrical box opening dimensions, can be directly coupled to electrical components, including fixture or luminaire devices. In this regard, the extendable sleeve 118 is not itself a mud ring, as mud rings typically include a flange or other structure configured to reduce a width or area of an electrical box opening. However, in some contexts, it may be advantageous to couple a mud ring to the extendable sleeve 118. In such contexts, the mud ring could potentially be coupled directly to the front opening 320 to allow the use of the electrical box assembly 100 for low-voltage devices.

Embodiments of the invention can also have a depth dimension configured to fit within wall spaces of various depths (e.g., 2.5 inch, 3.625 inch, 4 inch, 5.5 inch, or 6 inch). In this regard, embodiment of the invention can be configured to fit within any standard wall space.

As noted above, the extendable sleeve 118 is extendable between a retracted position (shown in FIGS. 1 through 4) and an extended position (shown in FIGS. 5 through 7) and any position in-between. The adjustment fasteners 132 are threadedly engaged with threads in the first and second sleeve tabs 136, 138 of the extendable sleeve 118. Accordingly, when the adjustment fasteners 132 are rotated, the threaded engagement of the adjustment fasteners 132 with the first and second sleeve tabs 136, 138, and the rotatable but non-translational engagement of the adjustment fasteners 132 with the first and second housing tabs 124, 126, can collectively cause the extendable sleeve 118 to move axially along the adjustment fasteners 132. Thus, via rotation of the adjustment fasteners 132 and corresponding axial movement of the adjustment fasteners 132 through the first and second sleeve tabs 136, 138, the extendable sleeve 118 can be secured at any of a plurality of depths relative to the electrical box housing 117. For example, in the retracted position, the front opening 140 of the extendable sleeve 118 is flush with the front opening 120 of the electrical box housing 117 (i.e., is spaced forward of the front opening 120 by a first distance of zero) and in the extended position, the front opening 140 of the extendable sleeve 118 is spaced a second (larger) distance 148 from the front opening 120 of the electrical box housing 117. In some embodiments, the second distance 148 can be in the range of about zero inch to about 1.5 inches. In some embodiments, the second distance 148 can be in the range of about zero inch to about 1 inch.

Figure 5:
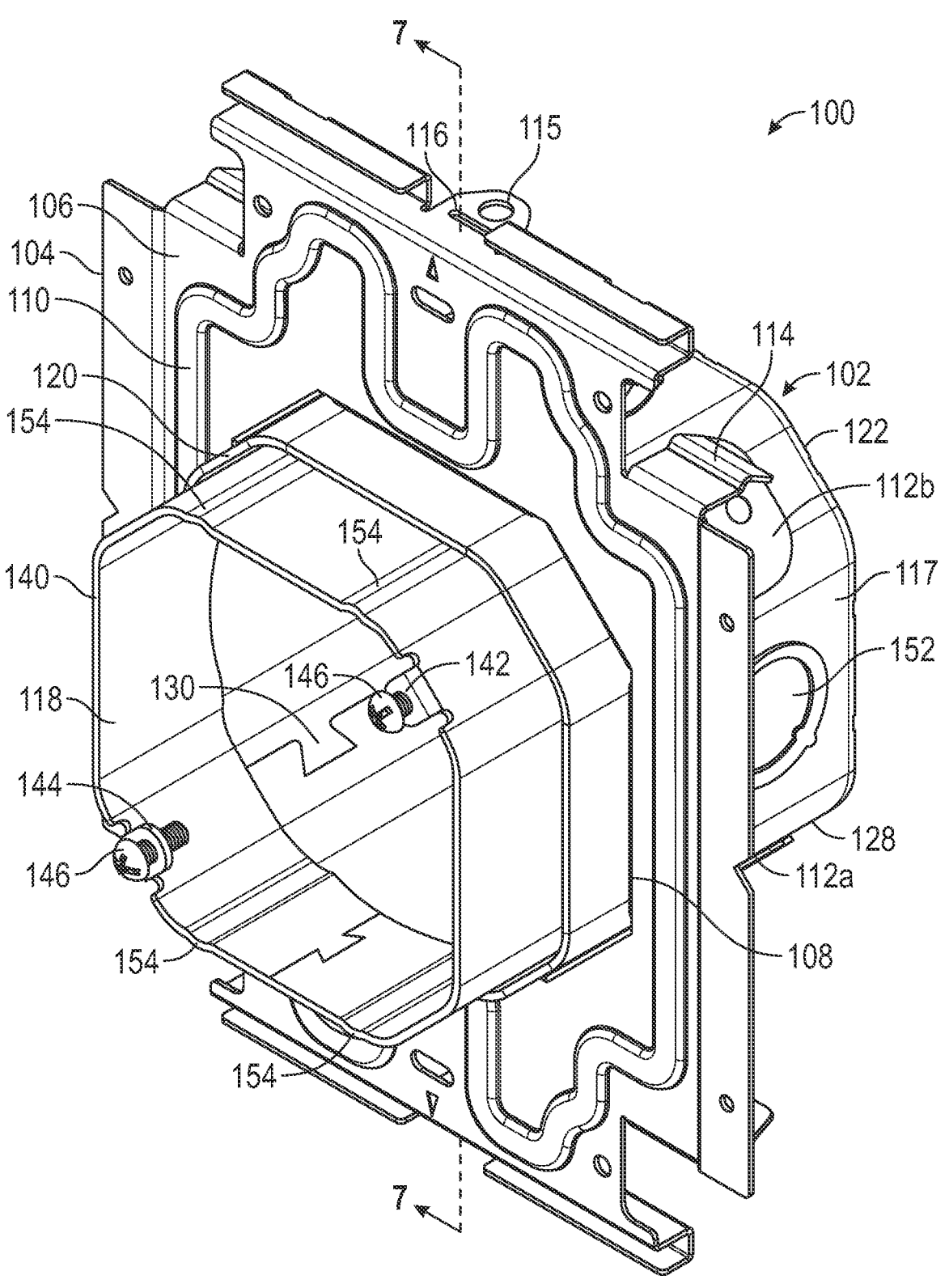
FIG. 5 is a front top isometric view of the electrical box assembly of FIG. 1 in an extended position.
Figure 7:
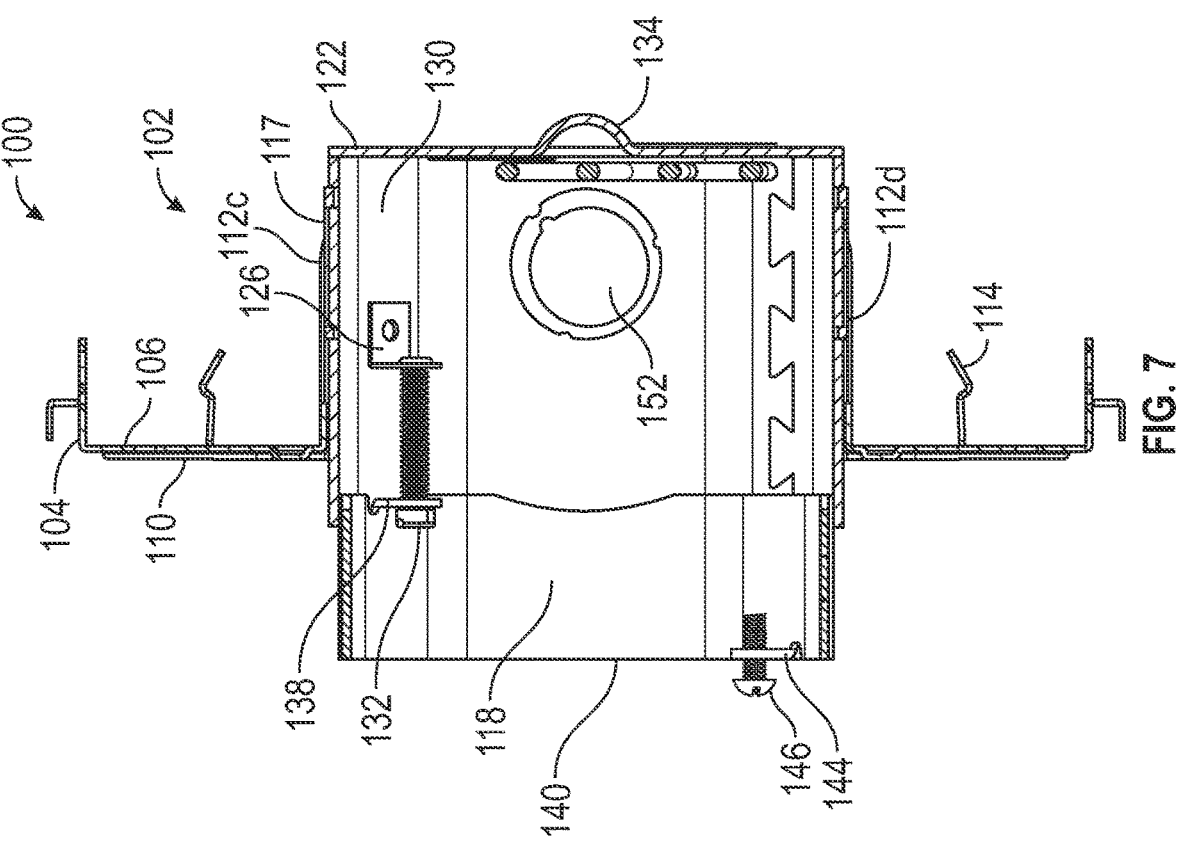
FIG. 7 is a cross-sectional view of the electrical box assembly of FIG. 1 in the extended position along line 7-7 in FIG. 5.
Figure 6:
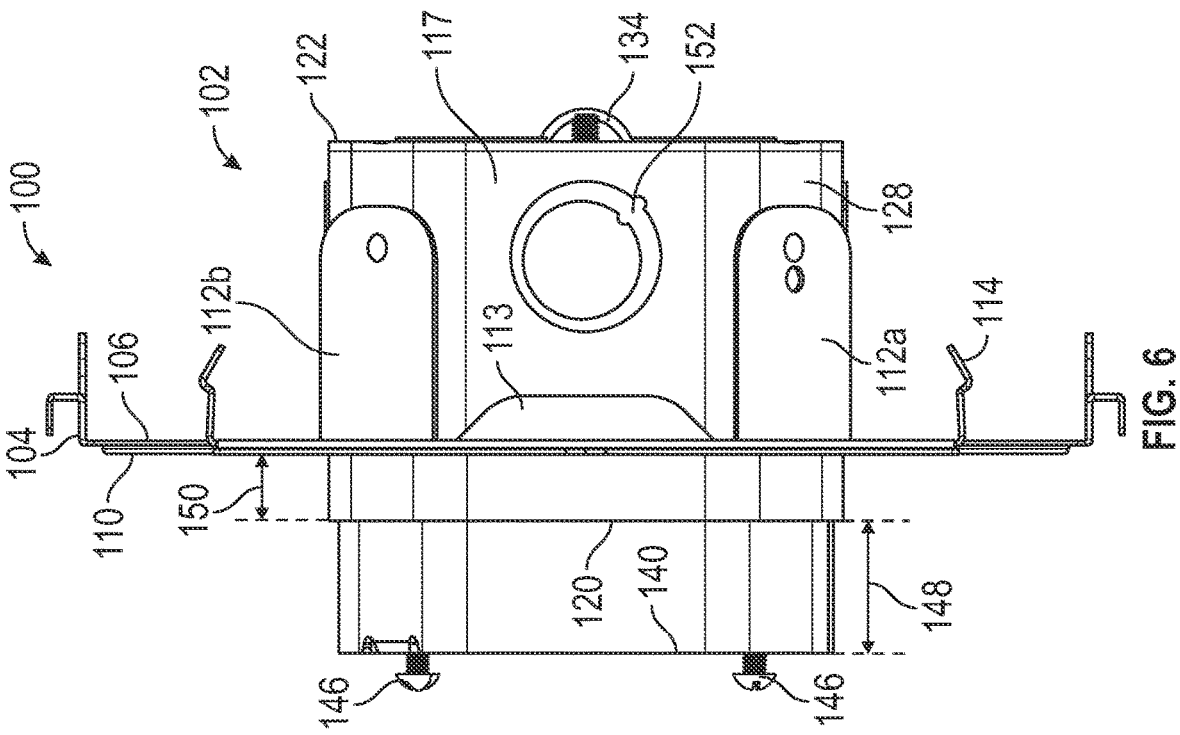
FIG. 6 is a side elevation view of the electrical box assembly of FIG. 1 in the extended position.

As illustrated in FIGS. 2 and 5, the extendable sleeve 118 can also include protruding ribs 154 extending along the exterior of at least one of the sides of the extendable sleeve 118. The protruding ribs 154 are configured to maintain contact with the electrical box housing 117 before, during, and after adjusting the depth of the extendable sleeve 118 to maintain a close fit and electrical continuity therebetween. Additionally, or alternatively, in some embodiments an electrical box housing can include protruding ribs configured to maintain contact with an extendable sleeve.

In some embodiments, as shown here, the electrical box 102 can be initially spaced a distance from the plate body 106. As shown in FIG. 3, with the extendable sleeve 118 in the retracted position, the electrical box housing 117 is secured to the centerplate 104 with the front opening 120 positioned a second distance 150 from the plate body 106. In some embodiments, the second distance 150 can be predetermined based on a standard wall covering or ceiling tile thickness. For example, the second distance 150 can be 0.625 inch based on a common thickness for drywall. Affixing the plate arms 112a, 112b, 112c, 112d to the electrical box housing 117 also maintains the distance between the first flange 113 (and one or more additional flanges) of the centerplate 104 and a knockout 152 (shown in FIG. 3). In some embodiments, the second distance 150 can be 0.525 inch. A shorter second distance may be advantageous in situations in which the wall covering thickness is unknown.

Depth adjustment of the electrical box 102 from within the electrical box 102 through the front openings 120, 140 can be advantageous to ensure the mounting tabs 142, 144 of the extendable sleeve 118 are flush with a ceiling covering (e.g., a ceiling covering panel 16, or ceiling tile, in a suspended ceiling system 18 as shown in FIGS. 8 and 9) when finishing an installation. For example, in some construction scenarios, a support bracket (e.g., the support bracket 20 as shown in FIGS. 8 and 9), to which an electrical box is mounted, will space a front opening of the electrical box above the outward facing surface of a ceiling covering panel (e.g., an outward facing surface 22 of the ceiling covering panel 16 shown in FIGS. 8 and 9). In certain scenarios, extension rings (not shown) would be required to be installed to extend the depth of the electrical box to be flush with the outer surface of the ceiling covering panel. Further, longer device fasteners would be required to reach the mounting tabs within the electrical box. The ability to adjust the depth of the electrical box 102 relative to the ceiling covering support eliminates the need to install extension rings.

FIGS. 8 and 9 illustrate the installation and adjustment of the electrical box 102 in a suspended ceiling system 18 with suspended ceiling grid members 10 and a ceiling covering panel 16. FIG. 8 shows the electrical box assembly 100 (i.e., the electrical box housing 117 and the centerplate 104) attached to a support bracket 20, which is attached to the suspended ceiling grid members 10. The electrical box 102 is in the retracted position with the front opening 140 of the extendable sleeve 118 flush with the front opening 120 of the electrical box housing 117, both of which are spaced from the outward facing surface 22 of the ceiling covering panel 16. FIG. 9 shows the extendable sleeve 118 in an extended position, having been adjusted by turning the adjustment fasteners (hidden), so that the front opening 140 of the extendable sleeve 118 is flush with the outward facing surface 22 of the ceiling covering panel 16, and the mounting tabs 142, 144 and the device fasteners 146 being easily accessible from below the suspended ceiling system 18. Additionally, because the electrical box housing 117 is fixed relative to the centerplate 104 through the affixing of the plate arms 112c, 112d (and 112a, 112b not shown) to the electrical box housing 117, electrical conduit (e.g., electrical conduit 12 shown in FIGS. 8 and 9) can be installed on the electrical box housing 117 prior to depth adjustment of the electrical box 102 via the extendable sleeve 118.

Further, the design of the centerplate 104 (i.e., the plate opening 108 having a shape corresponding to the shape of the electrical box housing 117, the plate arms 112a, 112b, 112c, 112d being fixed to the electrical box housing 117, and the embossment 110 provided on the plate body 106 minimizes deflection by forces applied to the electrical box 102 in the upward and downward directions.

Figures 10, 11A:
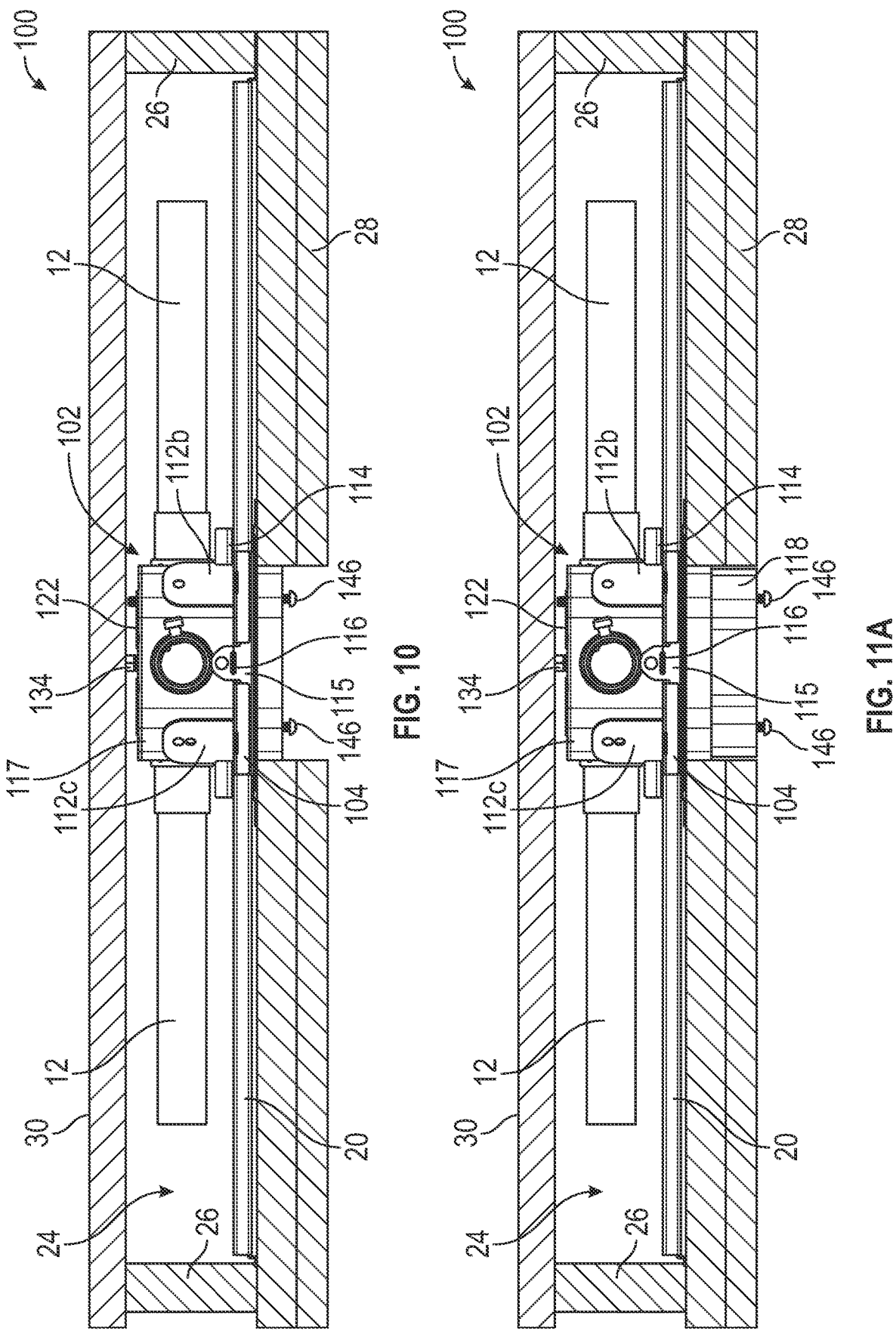
FIG. 10 is a top plan view of the electrical box assembly of FIG. 1 in the retracted position installed within a wall space according to an embodiment of the invention.
FIG. 11A is a top plan view of the electrical box assembly of FIG. 1 in the extended position installed within the wall space.

Continuing, FIGS. 10 and 11 illustrate the electrical box assembly 100 installed in a wall space 24 between a set of wall support members 26 and between a wall covering 28 and an opposing wall covering 30. As discussed above, the extendable sleeve 118 can be moved from a retracted position (shown in FIG. 10) to an extended position (shown in FIG. 11A). Further, the support wire loop 134 can perform as a stop configured to abut the opposing wall covering 30 to prevent the electrical box 102 from being pushed into the wall space 24.

As discussed herein, unless otherwise indicated, "translationally fixed" and the like does not necessarily indicate an absolutely fixed arrangement, in which zero translational movement is permitted. Rather, some translationally fixed components (e.g., the adjustment fasteners 132) may be able to move translationally somewhat, but only to a certain amount and generally not so as to provide meaningful translational adjustment of a corresponding component (e.g., the extendable sleeve 118). For example, depending on how the adjustment fasteners 132 are fixed to the first and second housing tabs 124, 126, the adjustment fasteners 132 may be able to move slightly in the axial direction, relative to the first and second housing tabs 124, 126 (e.g., by 1-5 mm or 1-3% of the axial length of the adjustment fasteners 132 or of the total depth of the electrical box 102).

In some embodiments, other aspects of the configuration illustrated in FIGS. 1 through 11 can also be changed while preserving similarly beneficial adjustability. For example, in some embodiments, fasteners may be translationally fixed relative to a housing tab and may engage a threaded feature at a different location on or in an extendable sleeve. Or a fastener threadedly engaged with a housing tab and translationally fixed but rotatable relative to an extendable sleeve. Similarly, although configurations with a set of opposing housing tabs (e.g., on opposing sides or corners) may sometimes provide a particularly optimal balance between stability and case of adjustment, some configurations may have a different number of housing tabs, or one or more housing tabs disposed differently relative to an electrical box housing than is illustrated in FIGS. 1 through 11.

Figures 12, 13:
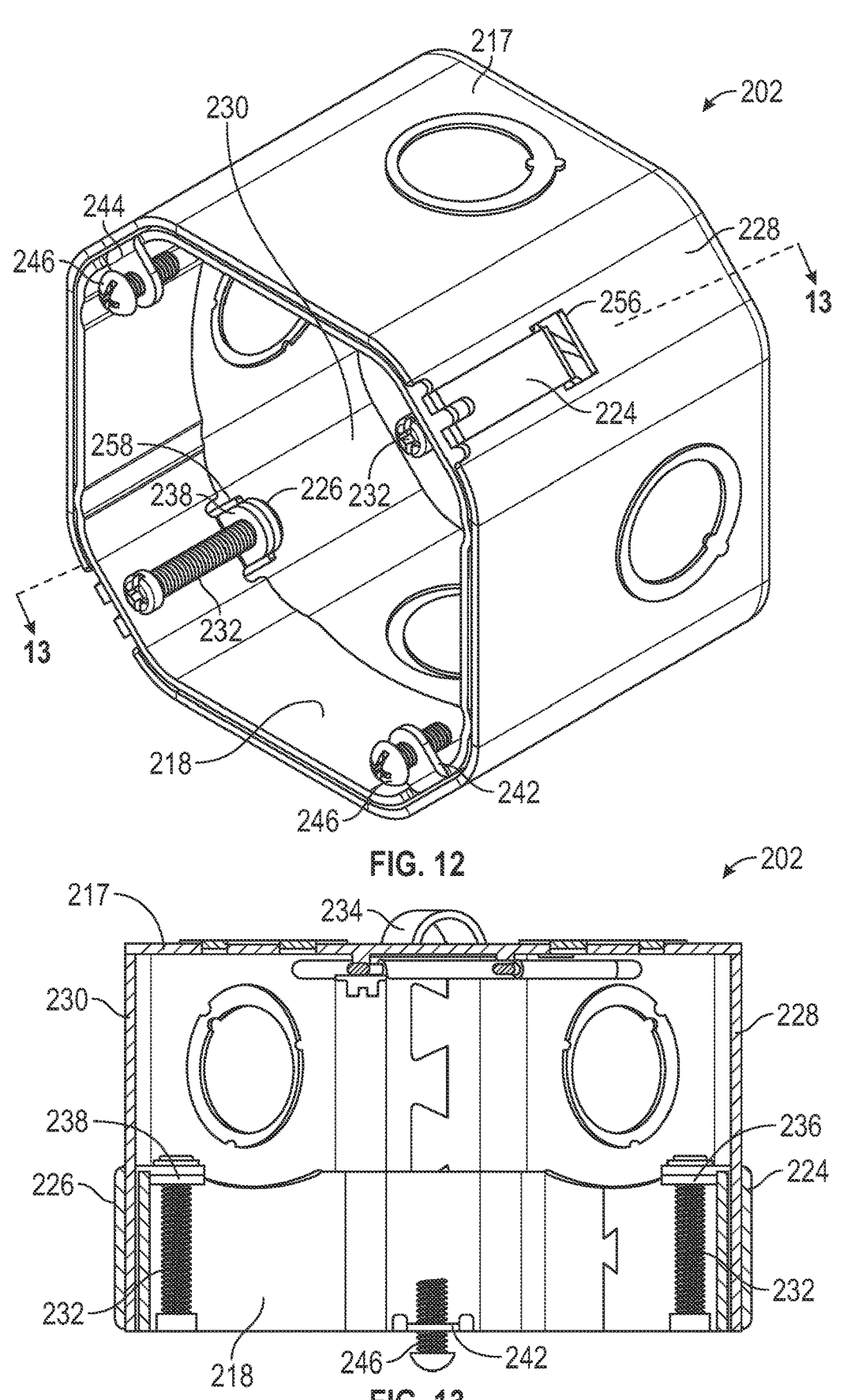
FIG. 12 is a front top isometric view of an electrical box according to another embodiment of the invention.
FIG. 13 is a cross-sectional view of the electrical box of FIG. 12 along line 13-13 in FIG. 12.

FIGS. 12 and 13 illustrate another embodiment of an electrical box 202 according to the invention, as also can be affixed within a centerplate (e.g., the centerplate 104 shown in FIG. 1) as part of an electrical box assembly. In many aspects, the electrical box 202 is similar to the electrical box 102 described above and similar numbering in the 200 series is used for the electrical box 202. For example, the electrical box 202 has an electrical box housing 217 with a support wire loop 234; an extendable sleeve 218 with first and second sleeve tabs 236, 238 and mounting tabs 242, 244 for receiving device fasteners 246; and threaded adjustment fasteners 232. The extendable sleeve 218 is also configured to be positioned within the electrical box housing 217 and translated relative to the electrical box housing 217 via the adjustment fasteners 232 between a retracted position and an extended position.

In some aspects, however, the electrical boxes 102, 202 differ from each other. For example, the electrical box housing 217 includes first and second housing tabs 224, 226 that are formed as extensions from the side walls 228, 230 of the electrical box housing 217 that are bent back around exterior sides of the side walls 228, 230 and bent to extend through slots 256, 258 and into the electrical box housing 217.

Figure 14:
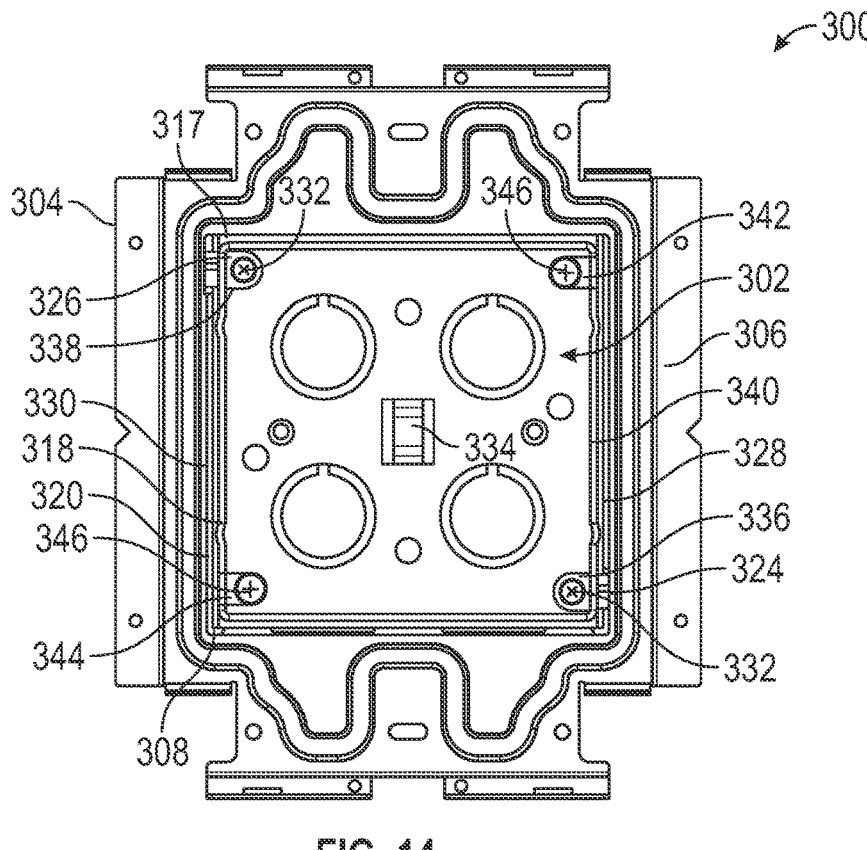
FIG. 14 is a front elevation view of an electrical box assembly according to another embodiment of the invention.
Figures 15, 16:
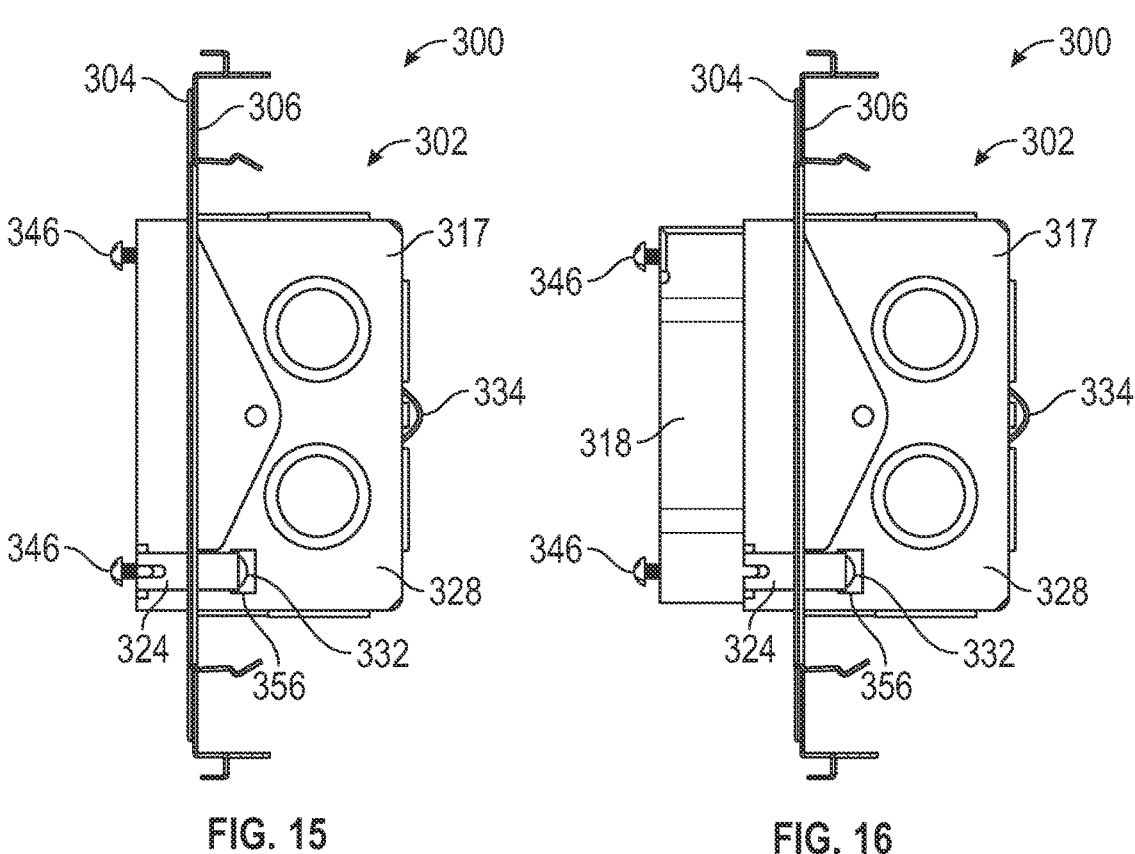
FIG. 15 is a side elevation view of the electrical box assembly of FIG. 14 in a retracted position.
FIG. 16 is a side elevation view of the electrical box assembly of FIG. 14 in an extended position.

FIGS. 14 through 16 illustrate another embodiment of an electrical box assembly 300 according to the invention. In many aspects, the electrical box assembly 300 is similar to the electrical box assembly 100 described above and similar numbering in the 300 series is used for the electrical box assembly 300. For example, the electrical box assembly 300 has a centerplate 304 with a plate body 306 and a plate opening 308; an electrical box 302 including an electrical box housing 317 with first and second housing tabs 324, 326 and a support wire loop 334; an extendable sleeve 318 with first and second sleeve tabs 336, 338, a front opening 340, and mounting tabs 342, 344 for receiving device fasteners 346; and threaded adjustment fasteners 332. The extendable sleeve 318 is also configured to be positioned within the electrical box housing 317 and translated relative to the electrical box housing 317 via the adjustment fasteners 332 between a retracted position and an extended position.

In some aspects, however, the electrical box assemblies 100, 300 differ from each other. For example, the electrical box housing 317 and the extendable sleeve 318 of the electrical box 302 are square. Additionally, the electrical box housing 317 includes first and second housing tabs 324, 326 that are formed as extensions from side walls 328, 330 of the electrical box housing 317 that are bent back around exterior sides of the side walls 328, 330 and bent to extend through slots 356, (hidden) and into the electrical box housing 317.

Figures 17, 18, 19:
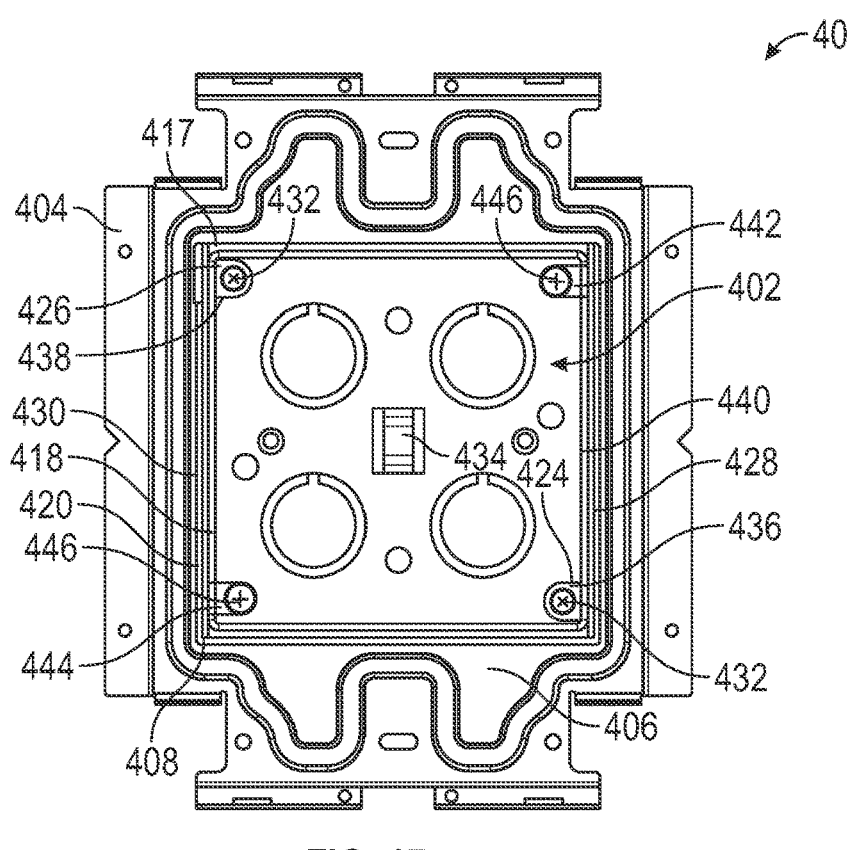
FIG. 17 is a front elevation view of an electrical box assembly according to another embodiment of the invention.
FIG. 18 is a side elevation view of the electrical box assembly of FIG. 17 in a retracted position.
FIG. 19 is a side elevation view of the electrical box assembly of FIG. 17 in an extended position.

FIGS. 17 through 19 illustrate another embodiment of an electrical box assembly 400 according to the invention. In many aspects, the electrical box assembly 400 is similar to the electrical box assembly 300 described above and similar numbering in the 400 series is used for the electrical box assembly 400. For example, the electrical box assembly 400 has a centerplate 404 with a plate body 406 and a plate opening 408; an electrical box 402 including an electrical box housing 417 with first and second housing tabs 424, 426 and a support wire loop 434; an extendable sleeve 418 with first and second sleeve tabs 436, 438 and mounting tabs 442, 444 for receiving device fasteners 446; and threaded adjustment fasteners 432. The extendable sleeve 418 is also configured to be positioned within the electrical box housing 417 and translated relative to the electrical box housing 417 via the adjustment fasteners 432 between a retracted position and an extended position.

In some aspects, however, the electrical box assemblies 300, 400 differ from each other. For example, the electrical box housing 417 is affixed to the centerplate 404 with the front opening 420 of the electrical box housing 417 flush with the plate body 406 and the plate opening 408. In some embodiments, the distance 448 between the front opening 420 of the electrical box housing 417 and the front opening 440 of the extendable sleeve 418 can be about 0 inches when the extendable sleeve 418 is in the retracted position (shown in FIG. 18) and 1.5 inches when in the extended position (shown in FIG. 19). In such a configuration, the electrical box 402 can have an electrical box housing 417 with a depth of 3.5 inches (as shown) and capable of being installed within wall spaces having depths of 3.625 inches, 4 inches, 5.5 inches, and 6 inches. The configuration also allows a mud ring to be installed on the extendable sleeve 418.

Further, the first and second housing tabs 424, 426 extend through slots (456, hidden) in the side walls 428, 430 of the electrical box housing 417 and are affixed to the exterior surface thereof.

Although the present disclosure describes the extendable sleeve as being received within the front opening of the electrical box housing, it is noted that the extendable sleeve could instead surround an exterior of the electrical box housing. In such examples, the extendable sleeve may still include a standard sized front opening. It therefore follows that the electrical box housing would be smaller than a standard electrical box housing. In such examples, the housing tabs may instead extend from the exterior of the electrical box housing to align with the sleeve tabs of the extendable sleeve. Furthermore, the ribs of the extendable sleeve may be configured to protrude inward to engage an exterior surface of the box housing.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

Also as used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

Also as used herein, unless otherwise limited or defined, "integral" and derivatives thereof (e.g., "integrally") describe elements that are manufactured as a single piece without fasteners, adhesive, or the like to secure separate components together. For example, an element that is stamped, cast, or otherwise molded as a single-piece component from a single piece of sheet metal or other continuous single piece of material, without rivets, screws, other fasteners, or adhesive to hold separately formed pieces together, is an integral (and integrally formed) element. In contrast, an element formed from multiple pieces that are separately formed initially then later fastened together, is not an integral (or integrally formed) element.

The discussion above is framed relative to particular electrical boxes and brackets and associated arrangements. However, those of skill in the art will recognize that this discussion implicitly also discloses various methods of adjustably mounting electrical boxes relative to support structures. Similarly, as also discussed above, the particular configurations of the electrical box and other components expressly described and illustrated in the various embodiments are presented as examples only, and the concepts disclosed herein can be used to adjustably secure electrical boxes (or other components) relative to a variety of support bracket configurations and support structures. In this regard, for example, electrical box assemblies according to some embodiments can be configured for attachment to between-stud supports, as integral parts of between-stud supports, for attachment directly to building studs or other building structures, for attachment between ceiling grid members, and so on. Further, specific features discussed in detail relative to certain embodiments can be generally configured or used similarly with other embodiments, including relative to similar features on those embodiments or as substitutions or additions to those embodiments.

Thus, embodiments of the invention can provide adjustability of electrical boxes. For example, some embodiments can provide extendable sleeves that allow an electrical box to be adjusted among any number of different finishing depths relative to an outward facing surface of a wall or ceiling cover, including any number of different mounting depths along a continuous range of depths.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An assembly for adjustable-depth installation of a lighting device relative to a support structure, the assembly comprising:
   a centerplate with a plate opening; and
   an electrical box with an extendable sleeve and an electrical box housing, the extendable sleeve slidably received within the electrical box housing and the electrical box housing received within the plate opening;
   the extendable sleeve having a front opening and the electrical box housing having a front opening;

the electrical box housing being fixed relative to the plate opening, so that the front opening of the electrical box housing is spaced outward from the plate opening by a first distance; and the extendable sleeve being movable between a retracted position, in which the front openings of the extendable sleeve and the electrical box housing are spaced outward from the plate opening by the first distance, and an extended position, in which the front opening of the extendable sleeve is spaced outward from the plate opening by a second distance larger than the first distance.

2. The assembly of claim 1, wherein the extendable sleeve is movable between the retracted position and the extended position by a set of adjustment fasteners, wherein the adjustment fasteners are axially fixed relative to the electrical box housing and are rotatable relative to the electrical box housing.

3. The assembly of claim 2, wherein the adjustment fasteners are accessible for adjustment from inside the electrical box through the front openings of the extendable sleeve and the electrical box housing.

4. The assembly of claim 3, wherein with the extendable sleeve in the retracted position the adjustment fasteners do not extend through the front opening of the extendable sleeve.

5. The assembly of claim 2, wherein the adjustment fasteners are axially fixed to housing tabs that extend inward of respective side walls of the electrical box housing.

6. The assembly of claim 5, wherein the housing tabs are integral tabs extending from the electrical box housing.

7. The assembly of claim 5, wherein the housing tabs are attached to exterior surfaces of the electrical box housing and extend through side walls of the electrical box housing to engage the set of adjustment fasteners.

8. The assembly of claim 5, wherein the housing tabs are arranged between the front opening of the electrical box housing and knockout openings in sidewalls of the electrical box housing.

9. The assembly of claim 5, wherein the extendable sleeve further includes device-mounting tabs that extend inward at the front opening of the extendable sleeve.

10. The assembly of claim 9, wherein the device-mounting tabs extend from opposed corners of the extendable sleeve and receive number 8 size screws.

11. The assembly of claim 10, wherein the housing tabs extend from a first side wall and a second side wall of the electrical box housing.

12. The assembly of claim 1, wherein the centerplate has a plurality of plate arms extending from a plate body, the plurality of plate arms fixedly secured to an exterior of the electrical box housing.

13. The assembly of claim 12, wherein the plate arms are a first set of plate arms and extend a first distance from the plate body and the centerplate further includes a second set of plate arms that extend a second distance from the plate body that is smaller than the first distance, each of the plate arms of the first and second sets extending along a corresponding exterior side of the electrical box housing.

14. The assembly of claim 1, wherein side walls of the extendable sleeve include ribs that protrude to maintain contact between the electrical box housing and the extendable sleeve with the extendable sleeve in the retracted position and in the extended position.

15. The assembly of claim 1, wherein the centerplate includes a plurality of spring arms and a tab that includes a plurality of bend lines to secure the assembly relative to a support structure.

16. The assembly of claim 15, wherein the centerplate includes an embossment that extends continuously to surround the plate opening.

17. The assembly of claim 1, wherein the electrical box is an octagonal electrical box and the plate opening of the centerplate is an octagonal opening.

18. An adjustable depth electrical box assembly comprising:

a centerplate including a plate body with a plate opening;

an electrical box housing that includes side walls and a back wall that define an interior area for electrical components and a front opening that provides access to the interior area, the electrical box housing extending through the plate opening so that the front opening of the electrical box housing is spaced apart from the plate body;

an extendable sleeve slidably received into the interior area of the electrical box housing at the front opening; and a set of adjustment fasteners that are axially fixed relative to the electrical box housing and rotatably secured to the extendable sleeve so that the extendable sleeve is movable along the set of adjustment fasteners between a retracted position and an extended position relative to the electrical box housing via rotation of the adjustment fasteners.

19. The adjustable depth electrical box assembly of claim 18, wherein the plate opening is a center opening;

wherein the extendable sleeve is an octagonal sleeve that includes device-mounting tabs that secure a lighting device to the extendable sleeve; and wherein the extendable sleeve adjustably extends through the center opening within the electrical box housing.

20. A method of securing a lighting assembly relative to a support structure, the method comprising:

affixing a centerplate to the support structure, the centerplate including a plate opening and supporting a lighting electrical box that includes an extendable sleeve and an electrical box housing, the extendable sleeve being slidably received within the electrical box housing, and a front opening of the electrical box housing being spaced outward from the centerplate by a first distance; and after a support structure covering has been installed on the support structure and around the electrical box, adjusting the electrical box relative to the centerplate and an outer surface of the support structure covering by moving the extendable sleeve within the plate opening between a retracted position, in which a front opening of the extendable sleeve is spaced outward from the plate opening of the centerplate by the first distance, and an extended position, in which the front opening of the extendable sleeve is spaced outward from the plate opening of the centerplate by a second distance larger than the first distance.

* * * * *